Patented June 17, 1947

2,422,275

UNITED STATES PATENT OFFICE 2,422,275

COMPOUNDED LUBRICATING OIL

Carl Winning, Westfield, and Dilworth T. Rogers, Plainfield, N. J., assignors to Standard Oil Development Company, a corporation of Delaware No Drawing. Application September 3, 1942, Serial No. 457,146

15 Claims. (Cl. 252—45)

This invention relates to a method of preventing the deterioration of organic materials, and it relates more particularly to a new type of additive for improving the properties of mineral lubricating oils.

More particularly, the invention relates to lubricating oil additives prepared from sulfur halides and unsaturated materials. When olefinic materials of more than four carbon atoms are treated with sulfur chlorides, products containing both sulfur and chlorine are obtained which are oil soluble but which are not desirable because of their unstable character. For example, a product made by reacting diisobutylene with sulfur monochloride will be found to be unstable and will slowly give off hydrochloric acid even after long periods of standing. An attempt to stabilize the material by mere heating results in precipitation of sulfur from the compound. Such a product is obviously not suitable for use in lubricating oils because of its corrosive nature.

In accordance with the present invention a sulfur halide is reacted with an unsaturated compound, preferably one of higher molecular weight than the gaseous olefins, and the reaction product is further reacted with an aromatic compound, such as phenol, to produce a material which is not only not corrosive when used as an additive for lubricating oils but also has the property of inhibiting the normal corrosiveness of such oils toward copper-lead and similar bearings now widely used in automotive engines. One of the functions of the aromatic material is to stabilize the sulfur present in the reaction product of the sulfur halide with the olefinic compound. Although all or a greater part of the halogen present is removed by the second reaction as hydrogen halide, the aromatic compound does not act merely as a dehydrohalogenating agent but actually enters into the reaction and becomes a constituent of the final reaction product. The resulting material is believed to possess an aromatic ring structure with an alkyl side chain containing sulfur in a stabilized form.

The final reaction products of the above described series of reactions not only reduce the corrosion of alloy bearings when blended into lubricating oils, but also notably improve engine cleanliness, and reduce ring sticking, piston skirt varnish and sludging tendencies of oils used in automotive engines. When the aromatic compound used in the second step of the process is a phenol, the overall reaction product may be improved by extracting with an aqueous or alcoholic alkali solution or by steam distillation. The remaining products are usually higher in sulfur content and are more effective as bearing corrosion inhibitors. However, the entire reaction product may also be used to advantage.

In the first reaction of the process any sulfur halide may be reacted with a compound containing one or more unsaturated carbon-to-carbon linkage, e. g., a C=C group, either in a straight or branched chain or in a cyclic group other than an aromatic nucleus, i. e., a non-benzenoid cyclic group. Thus, amylene, isobutylene, diisobutylene, triisobutylene, the codimer of isobutylene and normal butylene, cracked gasoline fractions, cracked paraffin wax, viscous olefin polymers, such as medium or high molecular weight polybutene, cyclohexene, cyclopentene, butadiene, pentadiene, isoprene, styrene, oleic acid, oleyl alcohol, pine oil, terpenes, and similar unsaturated materials may be used. Likewise, the reaction may be applied to compounds having acetylenic linkages, C≡C. Olefins of less than four carbon atoms are in general not considered suitable for the present invention, although it is not intended that their use be excluded. Derivatives of the above described compounds containing various substituent groups and atoms may also be used to advantage, since the substituent groups normally do not interfere with the principal reaction. The most suitable sulfur halides are sulfur dichloride and monochloride, especially the monochloride. The olefinic material and sulfur halide may be reacted in any desired proportions, but the more preferred ratio of olefinic material to sulfur halide is within the range from about 3:1 to 1:1 (molal ratio). Higher ratios may often be used when a portion of the olefinic material is to serve as a solvent to be removed later as unreacted material. The temperatures which have been found most satisfactory for this reaction are from about 20° to about 50° C. (about 70–125° F.), but the method may be carried out at considerably higher or lower temperatures if desired. Catalysts are not required. In the second reaction of the process, in which the reaction product of the sulfur halide with an olefin or like material is further reacted with an aromatic compound, the ratio of about one part by weight of aromatic material to one-half to ten parts by weight of sulfur halide-olefin reaction product may be used. When the aromatic material is a phenol, the most preferred ratio is about one part by weight of the phenol to three to ten parts by weight of the sulfur halide-olefin reaction product. In reacting phenol itself with the diisobutylene-sulfur monochloride condensate, the most desirable ratio is about one part of phenol to eight to ten parts of the condensate. The temperature of the reaction may range from about 40° to about 160° C. (about 100–320° F.), but the most desirable range has been found to be between about 80° and about 140° C. (about 175–285° F.).

In general, solvents are not required in either the first or second steps of the process because of the nature of the reactants employed. For example, when diisobutylene is used as the olefin source, any excess of this which is present undoubtedly acts in a solvent capacity. In cases where olefinic material of higher molecular weight is used or where the reaction mixture is not sufficiently fluid the reaction may be aided by use of an organic solvent such as a chlorinated hydrocarbon or the like. Also, with some types of reactants the presence of water or an alcohol or ether will be found to be beneficial.

The aromatic materials which may be used in the process include all types. The aromatic hydrocarbons, such as benzene, naphthalene, amyl benzene, wax alkylated naphthalene and the like, may be used, although compounds containing substituent groups, such as phenols, aniline, salicyclic acid, substituted salicyclic acids, α-naphthol, diphenyl oxide, etc., are more readily reacted. When unsubstituted hydrocarbons, particularly those having no alkyl groups, are employed, a condensing agent, such as aluminum chloride, stannic chloride, or the like, is usually necessary. In the case of the more active compounds no catalyst is needed.

A preferred group of aromatic compounds for use in accordance with the present invention are the phenols. These may be reacted with the sulfur halide-olefinic reaction product without the use of a catalyst, and the products of the reaction are particularly useful in improving the properties of lubricating oils. The more desirable and readily obtainable types of phenols and related compounds are phenol itself and its alkylated derivatives, such as the cresols, the xylenols, mesitol, butyl phenol, amyl phenol, diamyl phenol, diisobutyl phenol (also designated isooctyl phenol or tetramethyl butyl phenol), cetyl phenol, cashew nut shell phenol (cardanol), phenyl phenol, petroleum phenols, and the like, as well as the naphthols. Derivatives of such phenols containing substituents, such as halogen, nitro groups, amino groups, carboxyl groups, etc., may also be used, as well as the corresponding thiophenols and compounds having more than one hydroxyl or mercaptan group attached to the aromatic nucleus. Likewise, metal salts of the phenolic compounds may be employed.

It may be mentioned that the chlorophenols and chlorinated aromatic hydrocarbons are of particular value in forming compounds useful in extreme pressure lubricants. The reaction products of these compounds with sulfur halide-olefin condensates contain chlorine in stable form as well as sulfur. These products are stable at elevated temperatures. They are most conveniently prepared by first reacting an isobutylene polymer with sulfur monochloride or dichloride and then further reacting the product obtained with chlorophenol or a polychlorophenol or with chlorinated aromatics, such as chlorobenzene or polychlorobenzene. In place of pure phenols, mixtures of phenols, such as are available in petroleum phenols, may be chlorinated. Products similarly useful in extreme pressure lubricants may be obtained by reacting the sulfur halide derivatives of olefins with chlorinated phenol sulfides, or with phenol sulfides followed by chlorination of the product.

Another particularly preferred class of aromatic compounds are the aryl amines, such as aniline, diphenylamine, phenylene diamine, aminophenols, and the like. These are useful because of the antioxidant properties of the attached amino groups.

Aromatic compounds containing other substituent groups are also contemplated for use in accordance with this invention. These include compounds containing aryl, nitro, nitroso, nitrile, thiocyanate, aldehyde, carboxyl, and ether groups, as well as groups containing sulfur which partially or wholly replaces the oxygen of such groups. Included also are compounds in which a metal may replace the hydrogen of the carboxyl, hydroxyl or other groups.

Another particularly preferred class of aromatic compounds which may be reacted with the sulfur halide-olefinic reaction product to produce unusually valuable addition agents are the aromatic sulfides, particularly the phenol sulfides, in which two aromatic groups are joined by one or more sulfur atoms. The phenol sulfides are conveniently prepared by reacting phenols or alkylated phenols with sulfur chlorides. Such materials are known to be useful in themselves as anticorrosion agents, and their usefulness is increased by reacting them or their metal salts with the sulfur halide products of the present invention to form products containing additional sulfur in stabilized form.

In general, the preferred method of conducting the reactions of the present invention is first to treat the olefin or like material with the sulfur halide and then to follow this reaction by a subsequent treatment with the aromatic material. However, variations of this procedure may be employed, as by adding the sulfur halide to a mixture of the olefin and aromatic material, provided the olefin and aromatic material do not react directly with each other.

If desired, the reaction products of the present invention may be further treated. For example, those obtained by reaction with phenols or with phenol sulfides may be converted to metal salts such as those of tin, barium, calcium, zinc, magnesium, nickel or aluminum and the metal derivatives used as lubricating oil additives. Likewise, any free phenolic groups present may be converted to ester or ether groups.

As will be demonstrated below, one of the noteworthy advantages of the additives prepared in accordance with the present invention is their ability to reduce exhaust valve sticking in engine operation. In certain types of service, such as in railway Diesel engines, oils of otherwise satisfactory characteristics are often objectionable because of their tendency to cause sticking or erratic action of exhaust valves, presumably through the building up of oil decomposition products on the hot portions of the valve stems. Additives of the present invention markedly reduce this tendency in oils in which they are blended. Since fuel combustion products also come into contact with the valve parts, the additives may likewise be added to the fuels for both Diesel and gasoline engines to prevent or minimize the sticking of valves.

It is to be understood, however, that reduction in valve sticking is by no means the only advantage to be gained in using these additives. As noted above and as demonstrated below, the additives also bring about reduced corrosiveness toward alloy bearings and improved engine cleanliness as indicated by the decreased quantities of deposits found in ring grooves, on piston skirts and in other parts of the engines in which the additive compounded lubricants are used. Also, many of the additives exhibit film strength improving properties and their use in extreme pressure lubricants is accordingly contemplated in the present invention.

Generally, the additives of the present invention are most advantageously blended with lubricating oil base stocks in concentrations between the approximate limits of 0.02% and 5.0%, and preferably from 0.1% to 2.0%, although larger amounts may be employed. The exact amount to be used depends to a certain extent on the particular compounds used, the character of the mineral oil base and the operating conditions of the engine in which the lubricant is to be employed. When the additives are to be used in extreme pressure lubricants, concentrations of 1% to 15% are desirable and concentrations of 2% to 10% are preferred.

Concentrates of the additives in oil may also be prepared in, say, 25% to 75% concentration of additive and the concentrate later blended with other oils to give a final blend of lubricating oil containing the desired percentage of additive. Such concentrates are often desirable to save shipping weight and space and to facilitate blending operations.

Numerous examples of the preparation and utilization of useful products in accordance with the method of the present invention will be described in the examples which follow, but it is to be understood that these examples do not limit the scope of the invention in any way.

EXAMPLE 1

283.5 parts by weight of sulfur monochloride were added to 470 parts of close cut diisobutylene with stirring, the temperature being kept below 120° F. The product was then heated to 275° F., held at this temperature for two hours with stirring, following which the temperature was lowered to 180° F. and 56 parts of phenol were added, the temperature being then raised to 230° F. and held at this point for four hours with agitation. The overall product was distilled with steam, whereby 101 parts of a volatile material, mainly unchanged diisobutylene, were removed. An equal volume of benzol was added and the product heated to 250° F. in a vacuum to remove the benzol and water. To the remaining pure additive (amounting to 525 parts) 525 parts of a refined mineral oil of S. A. E. 20 grade were added, both additive and oil being warmed to 120° to 150° F. 105° parts of acid treated clay were added and the product agitated for one-half hour at 150° F. The product was filtered to obtain a light colored fluid concentrate of 50% additive strength. This concentrate was found to contain about 13% sulfur and about 0.25% chlorine.

EXAMPLE 2

This example represents a variation of the procedure of Example 1 in that a shorter and more direct reaction procedure and a lower reaction temperature were used. At a sufficiently slow rate to maintain the temperature between 105 and 120° F., 1417 parts by weight of sulfur monochloride were added with stirring to 3700 parts of diisobutylene. After an additional ½ hour of stirring, 280 parts of phenol were added, the temperature raised to 210° F. and heating continued for two hours. The product was then steam distilled, whereby 1685 parts of unreacted diisobutylene were recovered. The still residue was mixed with an equal volume of benzol and the mixture stripped free of benzol and water at 100° C. 2610 parts of final product were obtained containing 25.18 per cent sulfur. The additive was found to be completely oil-soluble, whereas that of Example 1 contained a small amount of oil-insoluble material.

EXAMPLE 3

178 parts by weight of diisobutylene were mixed with 100 parts of sulfur monochloride at room temperature. After approximately one minute a violent reaction set in with evolution of heat and hydrogen chloride. After the product had cooled to room temperature, petroleum ether was added and the solution washed several times with water and dried over sodium sulfate. The petroleum ether was removed under vacuum, and the unreacted diisobutylene was removed by heating up to 70° C. at 20 mm. pressure. The product was dissolved in petroleum ether and then washed with dilute caustic potash until acid free and then with water. The solution was dried over sodium sulfate and the solvent evaporated on the steam bath. A yield of 195 parts of product was obtained.

20 parts by weight of the product obtained as above were mixed with 8.5 parts of paracresol and heated on a steam bath for three hours. The product was washed with water and with petroleum ether and then with water again, followed by several washings with 5% aqueous caustic soda and again with water and dried over sodium sulfate and evaporated on a steam bath. 25 parts of a red oil having a rather pleasant odor were obtained. It showed the following analysis:

| | Percent |
|---|---|
| Sulfur | 23.8 |
| Chlorine | 0.47 |
| Carbon | 64.50 |
| Hydrogen | 9.42 |

EXAMPLE 4

25 parts by weight of sulfur monochloride were added to 712 parts of closely fractionated diisobutylene and the temperature raised to 60° C. After a short induction period the reaction started, then an additional quantity of 375 parts of sulfur monochloride was added during one hour and forty minutes at 55° to 60° C. The temperature was then held at 70° C. for one-half hour. Portions of this product of 250 parts by weight each were reacted with various phenols as follows: (A) 106 parts p-cresol; (B) 106 parts m-cresol; and (C) 100 parts phenol. In each case the mixture was heated on a steam bath overnight, and then dissolved in petroleum ether and extracted four times, 750 parts of 5% aqueous caustic soda solution being used in each extraction. Following this, the product was washed with water. To remove traces of water the product was mixed with benzol and the solution evaporated in vacuo. The final products showed the following analyses:

| | Liquid Product A | Semi-Solid Product B | Liquid Product C |
|---|---|---|---|
| Sulfur......per cent.. | 17.31 | 16.54 | 23.60 |
| Chlorine..........do.... | 0.19 | 0.18 | 0.24 |
| Carbon..............do.... | 68.63 | 69.12 | 60.67 |
| Hydrogen........do.... | 9.63 | 9.61 | 9.72 |
| Oxygen (By Difference) do.... | 4.24 | 4.55 | 5.97 |
| Neutralization No............ | 5.7 | 7.5 | 5.1 |
| Saponification No............ | 89.5 | 68.6 | 111.6 |

EXAMPLE 5

150 parts by weight of the diisobutylene-sulfur monochloride complex formed as in Example 4 were mixed with 98 parts of trichlorophenol and heated gently at about 190° F. for three hours. The product was steam distilled to remove the major proportion of the unreacted trichlorophenol, benzol was added and the solution washed with dilute alkali solution and water and distilled to remove the benzol. 90 parts of a product were obtained, showing the following analysis:

| | Percent |
|---|---|
| Sulfur | 28.37 |
| Chlorine | 3.56 |
| Carbon | 58.83 |
| Hydrogen | 8.72 |
| Oxygen (by difference) | 0.52 |

This analysis indicated that the final product contained the equivalent of 6.65% of reacted trichlorophenol.

EXAMPLE 6

256 parts by weight of the diisobutylene-sulfur monochloride complex formed as in Example 4 were mixed with 144 parts of alpha-naphthol. About 180 parts of benzol were added and the mixture heated on a steam bath for six hours. The reaction mixture was steam distilled, after which additional benzol was added and the product distilled to remove water. A yield of 370 parts was obtained having the following analysis:

| | Percent |
|---|---|
| Sulfur | 15.58 |
| Chlorine | 0.11 |
| Carbon | 72.89 |
| Hydrogen | 8.02 |
| Oxygen (by difference) | 3.4 |

200 parts of the above product were mixed with 200 parts of a refined mineral oil of S. A. E. 20 grade. The mixture was heated gently, cooled, and filtered, using a diatomaceous earth filter aid. About 5% of insoluble material was thus removed, and a 50% concentrate of additive in oil was obtained.

EXAMPLE 7

206 parts by weight of sulfur monochloride were added to 224 parts of diisobutylene during one hour, keeping the temperature below 50° C. The temperature was then held at 50° C. for fifteen minutes, and the entire product was then added to 234 parts by weight of diamyl phenol which had been warmed on a steam bath, and the whole was heated on a steam bath for 14 hours at 180° F. The product was diluted with an equal volume of benzol and extracted with 950 parts of 5% solution of caustic soda in 66% methanol. On evaporation of the benzol, it was noted that HCl was evolved, indicating incomplete reaction. The product was therefore further reacted with 200 parts of diamyl phenol and the above steps of dilution with benzol, extraction with caustic soda-methanol, and removal of benzol, were repeated, yielding 430 parts of product. This contained 12.02% sulfur and 1.53% chlorine.

EXAMPLE 8

A petroleum phenol product (B. P.=428–610° F). was obtained by extracting a heating oil fraction of cracked petroleum oil with strong caustic alkali solution, liberating the free phenols by treatment with carbon dioxide and fractionating the resulting phenols to obtain the desired cut. 170 parts by weight of such petroleum phenol product were heated on a steam bath with 225 parts of the diisobutylene-sulfur monochloride product formed as in Example 4. The heating was continued overnight and the product then steam distilled at 100° C., 30 parts of diisobutylene being recovered thereby. This product was diluted with about an equal volume of petroleum ether and then extracted with about 3000 parts of a 5% solution of caustic soda in 66% methanol, and the raffinate washed with water and dried over sodium sulfate. The final material thus obtained represented the petroleum ether-soluble, alcoholic NaOH-insoluble portion of the reaction product. It contained 19.14% sulfur.

EXAMPLE 9

250 parts of a diisobutylene-sulfur monochloride reaction product prepared as described in Example 3, were washed with about 3000 parts of a 5% aqueous caustic soda solution and then dried with sodium sulfate and benzene. 186 parts of aniline were added and the mixture allowed to stand at room temperature for some time. There was a slow separation of aniline hydrochloride. When the mixture was later heated on a steam bath for two hours a slight amount of H₂S was evolved. The product was cooled, washed with water, then with 1% aqueous hydrochloric acid, and again with water and then dried. The product was taken up with petroleum ether, leaving 12 parts of an oil-soluble, peach colored solid as a residue. The analysis of this solid material was as follows:

| | Per cent |
|---|---|
| Sulfur | 1.71 |
| Chlorine | 24.49 |
| Nitrogen | 6.59 |
| Hydrogen | 9.14 |

The solvent was removed from the above petroleum ether solution leaving 198 parts of a liquid product having the following analysis:

| | Per cent |
|---|---|
| Sulfur | 21.29 |
| Chlorine | 4.15 |
| Nitrogen | 0.96 |
| Carbon | 63.77 |
| Hydrogen | 9.73 |

EXAMPLE 10

The caustic soda extract obtained in the treatment of the reaction product of phenol with the diisobutylene-sulfur monochloride reaction product, described in Example 4 (C), was acidified with hydrochloric acid, whereby a red oily layer was produced. The oil layer was extracted with benzol and the benzol solution dried over sodium sulfate and evaporated to remove the solvent. 50 parts of a red colored resin were obtained having the following analysis:

| | | |
|---|---|---|
| Sulfur | per cent | 9.12 |
| Chlorine | do | 0.18 |
| Carbon | do | 76.05 |
| Hydrogen | do | 9.75 |
| Oxygen (by difference) | do | 4.9 |
| Neutralization number | | 11.8 |
| Saponification number | | 35.0 |

EXAMPLE 11

A quantity of sulfur monochloride was purified by gravity filtration through a 2 inch bed of granulated sodium cyanide. 2835 parts by weight of the treated material were added slowly over an 8-hour period to 4704 parts of diisobutylene, keeping the temperature below 50° C. The temperature was then raised to 280° F. and held at this point for about two hours. 565 parts of phenol were then added during 15 minutes and the mixture was heated for four hours at 232° F. After cooling, the product was steam distilled at 212° F.

to remove diisobutylene and then an equal volume of benzol was added and distilled off under diminished pressure to remove water, leaving 2667 parts of product, containing 26.32% sulfur and 0.40% chlorine.

A portion of this product was added to an equal weight of an S. A. E. 20 grade refined lubricating oil, heated to 150° F. with 10% of acid treated clay and filtered, using a diatomaceous earth filter aid. The final product was a clear 50% concentrate of the additive in lubricating oil, suitable for blending purposes.

EXAMPLE 12

500 parts of the additive product obtained in Example 11 (before blending in oil to 50% concentration) were extracted with 2 liters of 5% KOH solution in 66% aqueous methanol, 500 cc. of benzene mixed with the alkaline solution and the mixture allowed to separate into two layers. The upper benzene layer, bright red in color, was filtered with the aid of diatomaceous earth and then washed with water and dried with sodium sulfate. The benzene was removed by evaporation, leaving a red viscous liquid completely soluble in high V. I. mineral oils. It had the following analysis:

| | Per cent |
|---|---|
| Sulfur | 27.66 |
| Chlorine | 0.45 |

EXAMPLE 13

To 168 parts of close-cut diisobutylene were added slowly 155 parts of sulfur dichloride. During this step, lasting 1½ hours, the reaction temperature was kept below 30° C. The product was then added immediately to 162 parts of p-cresol and the mixture allowed to remain on the steam bath overnight. The product was then steam distilled, 25 parts of diisobutylene being thus recovered. The residual oil was found to be completely soluble in petroleum ether, and the resulting solution in about an equal volume of petroleum ether was washed with 2100 parts of 5% sodium hydroxide. The petroleum ether was then removed by evaporation on the steam bath, leaving 230 parts of a dark red oily liquid product which had the following analysis:

| | | |
|---|---|---|
| Carbon | per cent | 67.97 |
| Hydrogen | do | 8.69 |
| Sulfur | do | 17.00 |
| Chlorine | do | 0.79 |
| Oxygen (by difference) | do | 5.55 |
| Neutralization No. | | 12.8 |
| Saponification No. | | 106.7 |

EXAMPLE 14

405 parts of sulfur monochloride were added slowly to 672 parts of a C₈ hydrocarbon mixture consisting chiefly of the codimer of isobutylene and normal butylene. During this step the temperature was kept below 125° F. Then the temperature was raised to 212° F. and heating continued for 3 hours. 80 parts of phenol were added and the mixture heated for an additional 3 hours at 212° F. The product was steam distilled whereby 230 parts of unreacted codimer were recovered. The still residue was mixed with benzol and distilled to remove water, leaving a dark viscous liquid product containing 25.06% sulfur and 0.61% chlorine. A 50% concentrate of the additive was prepared by adding the material to an equal weight of an S. A. E. 20 grade refined lubricating oil, contacting the product for ½ hour with 10% by weight of acid-treated clay and filtering. The concentrate contained 12.86% sulfur.

EXAMPLE 15

This example demonstrates the preparation of additives by direct reaction of phenols, olefins and sulfur halides. Equimolecular proportions of closely fractionated diisobutylene (168 parts by weight) and p-cresol (162 parts) were mixed together and cooled to 15° C. To this were added slowly 155 parts of sulfur dichloride and the temperature was allowed to rise gradually. Reaction was observed to begin between 30 and 40° C. After the mixture had stood for some time at room temperature, it was heated for five hours on the steam bath. The product was vacuum distilled (300 mm. pressure) up to 220° F. yielding 31 parts of distillate which was mainly unreacted diisobutylene. The residue was extracted with about an equal volume of petroleum ether and the petroleum ether solution extracted four times with 5% caustic soda solution (750 parts used in each extraction).

The petroleum ether solution was then evaporated to dryness, leaving 180 parts of a liquid product having the following analysis:

| | Per cent |
|---|---|
| Carbon | 66.39 |
| Hydrogen | 8.85 |
| Sulfur | 18.86 |
| Chlorine | 1.88 |

EXAMPLE 16

This example demonstrates the effectiveness of the products prepared as described in the foregoing examples in inhibiting the corrosiveness of a typical mineral lubricating oil toward the surfaces of copper-lead bearings. The base oil used was a refined mineral lubricating oil of S. A. E. 20 grade. A blank sample of this oil, as well as samples of the oil to which small quantities of the various additives were added, were submitted to a bearing corrosion test conducted as follows:

500 cc. of the oil were placed in a glass oxidation tube (13" long and 2⅝" diameter) fitted at the bottom with a ¼" bore air inlet tube perforated to facilitate air distribution. The oxidation tube was then immersed in a heating bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each four-hour period the bearing surfaces were repolished. Each time the bearings were removed they were washed with naphtha and weighed to determine the amount of loss by corrosion (prior to repolishing). The cumulative weight losses of all the bearings used in a given test at the end of the various four-hour periods are given in Table I. The additive is designated by the number of the example in the present specification in which the preparation of the additive is described and by the aromatic compound which is reacted with the sulfur monochloride-diisobutylene complex. Each oil blend contained 0.25% by weight of the additive. (In those cases in which the additive was prepared as a 50% concentrate in oil, 0.5% by weight of the concentrate was employed to give 0.25% of effective additive.)

Table I

| Additive | Cumulative Bearing Weight Loss (mg. per 25 sq. cm. surface) | | | | | | Bearing Life,[1] Hours |
|---|---|---|---|---|---|---|---|
| | 4 | 8 | 12 | 16 | 20 | 24 | |
| Blank Oil | 3 | 181 | | | | | 5 |
| Ex. 1 (phenol) (in 50% solution in oil) | 0 | 0 | 8 | 20 | 188 | | 17 |
| Ex. 3 (p-cresol) | 0 | 0 | 3 | 9 | 24 | 188 | 22 |
| Ex. 4 (A) (p-cresol) | 0 | 0 | 0 | 4 | 253 | | 17 |
| Ex. 4 (B) (m-cresol) | 0 | 0 | 0 | 1 | 3 | 18 | 25 |
| Ex. 4 (C) (phenol) | 0 | 0 | 0 | 0 | 2 | 10 | 25 |
| Ex. 5 (trichlorophenol) | 0 | 0 | 5 | 11 | 32 | 275 | 21 |
| Ex. 6 (alpha naphthol) (in 50% solution in oil) | 0 | 0 | 5 | 10 | 32 | 199 | 21 |
| Ex. 7 (diamylphenol) | 0 | 1 | 12 | 295 | | | 13 |
| Ex. 8 (petroleum phenols) | 0 | 0 | 7 | 15 | 247 | | 17 |
| Ex. 9 (aniline) | 0 | 6 | 120 | 454 | | | 10 |
| Ex. 11 (phenol) | 0 | 0 | 3 | 9 | 129 | | 17 |
| Ex. 12 (phenol) | 0 | 0 | 2 | 14 | 112 | | 17 |
| Ex. 14 (codimer-phenol) | 0 | 0 | 1 | 4 | 66 | | 19 |
| Ex. 15 (p-cresol) | 0 | 0 | 5 | 135 | 417 | | 14 |

[1] Hours to cause 50 mg. bearing weight loss per 25 sq. cm. of bearing surface.

It will be seen that every one of the various sulfur-containing additives markedly increased the bearing corrosion resistance of the base oil, although all did not perform this function to the same degree. The bearing corrosion resistance is obviously not the only property desired and other features of the various additives must be considered as is pointed out in the examples which follow.

EXAMPLE 17

In the following series of tests the blank oil and blends of the oil with 0.25% of additive prepared in certain of the preceding examples were submitted to the standard Indiana oxidation test, described in S. A. E. Journal, vol. 34, page 167 (1934). The results are shown in Table II, the values given representing the number of hours required for 10 grams of the oil to form 10 milligrams of sludge.

Table II

| Additive | Indiana Oxidation Life (Hours to Form 10 mg. Sludge/10 gms. of oil) (Hours) |
|---|---|
| Blank Oil | 66 |
| Ex. 4 (A) (p-cresol) | 76 |
| Ex. 5 (trichlorophenol) | 71 |
| Ex. 10 (phenol) (34% phenol represented in final reaction product) (portion soluble in 5% alkali and in oil) | 82 |
| Ex. 11 (phenol) (10% phenol represented in final reaction product) | 63 |
| Ex. 12 (portion of Example 11 product which was insoluble in alcoholic alkali) | 80 |

It will be noted that although the products of Examples 11 and 12 were about equal in their bearing corrosion inhibiting properties (Example 16), the Example 11 product actually slightly increased the sludging tendency of the base oil. However, by extracting this additive with alcoholic alkali (Example 12) a product was obtained having greatly increased sludge inhibiting properties. This effectively demonstrates the advantages of selecting fractions of certain of the reaction products of the present invention and utilizing them separately in lubricating oil compositions.

EXAMPLE 18

In the following tests the base oil consisted of a solvent extracted Mid-Continent paraffinic oil of 46 seconds Saybolt viscosity at 210° F., 110 V. I., to which had been added about 0.8% of polybutene as a V. I. improver to give a lubricating oil of 52 seconds viscosity at 210° F. and 125 V. I. The thickened base oil and a blend of such oil with 0.57% of the additive prepared as in Example 1 were tested in a six-cylinder Chevrolet engine, each run being made for 64 hours at 3150 R. P. M., 30 B. H. P. output, 13.5:1 air:fuel ratio, 280° F. oil temperature, and 200° F. water jacket temperature. To study the corrosive tendencies of the oils, two of the six connecting rods in the engine were fitted with copper-lead bearings. After each run the engine parts were inspected and given demerit ratings based on their condition. The individual ratings were weighted according to their relative importance and an overall rating calculated from them. It should be noted that the lower the demerit rating, the better the engine condition and, hence, the better the oil performed in the engine.

The results of these engine tests, including the copper-lead bearing weight losses, are found in Table III.

Table III

| Oil | Engine Demerits | | | Cu-Pb Bearing Weight Loss (Gms./Bearing) |
|---|---|---|---|---|
| | Overall | Ring Zone | Sludge | |
| Base Oil | 1.73 | 3.18 | 1.19 | 5.821 |
| Base Oil+Additive | 1.35 | 2.48 | 0.53 | 0.723 |

It will be seen from these data that the additive greatly improved the engine performance of the base oil, lowering of the overall demerit from 1.73 to 1.35 representing a very decided increase in engine cleanliness. Also, the oil containing the additive was only about 12% as corrosive as the base oil itself, which likewise indicates a very large improvement.

EXAMPLE 19

The following series of tests were conducted in a C. F. R. single cylinder engine, each run being made for 60 hours at 1800 R. P. M., 200° F. oil temperature and 200° F. water jacket temperature. The engine parts were given demerit ratings as in Example 18. The base oil used was a solvent extracted Mid-Continent paraffinic oil of 52 seconds viscosity Saybolt at 210° F. and 107 V. I. to which had been added 1.8% of polybutene of about 12,000 molecular weight as a V. I. improver to form a finished oil of 72 seconds Saybolt viscosity at 210° F. and 120 V. I. This base oil, with the polybutene, was tested in the engine, also when further blended with 0.5% of the additive concentrate prepared as described in Example 1. Since the additive of Example 1 is a 50% oil concentrate, the actual amount of active material in the finished oil was 0.25%. A further blend was prepared by blending the base oil with 0.25% of a mixed additive prepared by mixing two parts of the material prepared in Example 4 (C) with one part of the additive prepared as in Example 10. The results are given in Table IV.

Table IV

| Oil | Engine Demerits | | | |
|---|---|---|---|---|
| | Overall | Ring Zone | Piston Skirts | Sludge |
| Base Oil | 2.55 | 3.37 | 2.00 | 2.25 |
| Base Oil+Additive (Ex. 1) | 1.38 | 2.08 | 0.75 | 1.00 |
| Base Oil+Mixed Additives (Ex. 4 (C)+Ex. 10) | 2.04 | 2.77 | 1.50 | 2.00 |

EXAMPLE 20

The following engine tests were conducted for 60-hour periods in a single-cylinder Caterpillar Diesel engine run under high temperature, high load conditions, namely 18.78 B. H. P. output (112% of rated load), 1000 R. P. M., 195° F. oil temperature and 140° F. air temperature. The base oil employed was a solvent extracted Mid-Continent paraffinic oil of 52 seconds Saybolt viscosity at 210° F. The results obtained when using this oil as well as a blend of the base oil with 1% of the additive concentrate prepared as in Example 1, are given in Table V.

Table V

| Oil | Engine Demerits | | | | Cu-Pb Bearing Wt. Loss Mg. |
|---|---|---|---|---|---|
| | Overall | Ring Zone | Piston Skirts | Oil Filter | |
| Base Oil | 1.46 | 1.55 | 1.0 | 2.0 | 82 |
| Base Oil+Additive | 0.97 | 1.17 | 0.75 | 1.25 | 1+3 |

1 Bearing gained weight.

It is notable that under the severe conditions of the above described engine tests, the additive effected such a marked improvement in the performance of the base oil. Other sulfur containing addition agents already known in the art, such as sulfurized sperm oil and tertiary amyl phenol sulfide, while serving adequately as inhibitors of bearing corrosion and to some extent as improving agents for internal combustion engine lubricants under normal service conditions, have been found to be entirely inadequate for lubricants employed in engines run under high load, high temperature conditions. As the above example shows, the additives of the present invention are suitable for use also under these severe conditions, not only improving engine performance but also inhibiting corrosion of alloy bearings.

EXAMPLE 21

This example demonstrates the action of additives of the present invention in reducing the valve sticking tendency of engines. For the engine tests, a C. F. R. single-cylinder engine was used under the operating conditions of 180° F. oil temperature, 180° F. water jacket temperature and a speed of 1550 R. P. M. In each case the engine was run until erratic valve action set in as noted by a drop in power output and by stroboscopic observation. The base oil used in these tests was a conventionally refined Coastal oil of 80 seconds Saybolt viscosity at 210° F. Both the base oil and a blend containing 0.5% of the additive concentrate prepared as in Example 1 were tested in this manner, the results obtained being presented in Table VI.

Table VI

| Oil | Hours to Give Erratic Exhaust Valve Action |
|---|---|
| Base Oil | 80 |
| Base Oil+Additive | 330+ |

Not only do the additives of the present invention improve the tendency of lubricating oils in which they are blended to promote engine cleanliness, but they also enhance the desirable features of other detergent additives, particularly the metal soaps, metal phenates, metal alcoholates, metal phenol sulfides, metal mahogany sulfonates, metal alkylphenol sulfonates, metal organo phosphates, thiophosphates, thiophosphites, and the like. The following two examples describe engine tests in which the additives were employed in conjunction with metal salts of alkylated phenol sulfides. It will be seen that action of the latter as detergents was greatly enhanced by the presence of the additives of the present invention and at the same time the weight losses of copper-lead bearings were also materially reduced.

EXAMPLE 22

These tests were made in a Chevrolet engine, each run being made for 36 hours at 3150 R. P. M., 30 B. H. P., 280° F. oil temperature, and 280° F. water jacket temperature. Engine demerit ratings and copper bearing weight losses were determined. The oil without the additive of the present invention consisted of a solvent extracted Coastal oil of 60 seconds Saybolt viscosity at 210° F., to which had been added 0.5% of barium diisobutyl phenol sulfide, 0.5% of barium diisobutyl phenol disulfide, and 0.25% of stearyl alcohol as detergents and auxiliary agents. This oil was tested alone in the engine and after blending with 0.25% of the additive prepared as in Example 1. The results are shown in the following table:

Table VII

| Oil | Engine Demerits | | | Cu-Pb Bearing Weight Loss (gms./ bearing) |
|---|---|---|---|---|
| | Overall | Ring Zone | Piston Skirts | |
| Oil without Ex. 1 additive | 1.24 | 1.71 | 0.72 | 0.53 |
| Oil with Ex. 1 additive | 0.88 | 1.07 | 0.04 | 0.10 |

EXAMPLE 23

A test similar to that described in Example 22 was made in a 4-cylinder General Motors Diesel engine at 2,000 R. P. M., 26 B. H. P. per cylinder, 250° F. oil temperature and 200° F. water jacket temperature. The blended oil used in these tests, but without the additive of the present invention, consisted of an extracted Mid-Continent oil of 173 seconds Saybolt viscosity at 100° F. and 103 V. I., with which had been blended 0.5% of barium diisobutyl phenol sulfide, 0.5% barium diisobutyl phenol disulfide, and 0.25% stearyl alcohol. In one of the tests this oil was further blended with 0.25% of the additive described in Example 1. The results are shown in the following table:

Table VIII

| Oil | Hours | Over-all | Ring Zone | Piston Skirts | Sludge | Cu-Pb Bearing Weight Loss (gms./bearing) |
|---|---|---|---|---|---|---|
| Oil without Ex. 1 additive | 78¼ | 1.6 | 2.7 | 4.8 | 0.9 | 4.78 |
| Oil with Ex. 1 additive | 150 | 1.3 | 2.5 | 3.9 | 0.4 | 0.07 |
| Do | 300 | 1.6 | 3.1 | 5.1 | 0.4 | 0.10 |

EXAMPLE 24

A grease made with 9% of a lithium soap of hydrogenated fish oil acids and another portion of the same grease containing 0.25% of the product of Example 13 were tested for oxidation stability in the Norma-Hoffman bomb test which is described in Product Engineering, vol. VII, page 210 (1936). The grease samples were placed in glass holders, the bombs were held at 210° F. and 110 pounds oxygen pressure was used in the tests. Brass was present as a catalyst. The results obtained, shown in Table IX, demonstrate that the additive almost tripled the oxidation stability of the grease as measured by the number of hours elapsing before rapid oxidation began.

Table IX

| Grease Sample | Bomb Life, hours [1] |
|---|---|
| Lithium Soap Grease | 12 |
| Lithium Soap Grease+0.25% Additive of Ex. 13 | 32 |

[1] Hours elapsed from start of test until rapid oxidation began as evidenced by marked drop in oxygen pressure in the bomb.

EXAMPLE 25

A refined lubricating oil of 52 seconds Saybolt viscosity at 210° F. was tested for load carrying capacity on the Almen testing machine. The Almen test is described in the Proceedings of the American Petroleum Institute, 13th Annual Meeting, section III, page 119, published December 1932. An oil blend containing 1% of the additive of Example 5 and another oil blend containing 2% of a 50% additive concentrate prepared as in Example 1 were also submitted to the same test. The results were as follows:

Table X

| Oil | Almen Test Weights Carried |
|---|---|
| Base Oil | 1 |
| Base Oil+1% of Ex. 5 additive (made with trichlorophenol) | 7 |
| Base Oil+2% of Additive Concentrate of Ex. 1 (1% effective additive) | 4 |

The improvement in load carrying ability imparted by the additives will be readily noted.

EXAMPLE 26

A 50% additive concentrate prepared from sulfur monochloride, diisobutylene and phenol, as in Example 1, was blended in an S. A. E. 90 gear oil in 2%, 5% and 10% concentrations (1%, 2.5%, and 5% actual additive) and compared with the base oil itself in the Almen and S. A. E. testing machines. The S. A. E. machine is described in the S. A. E. Journal (Transactions) for 1936, page 293. The results were as follows:

Table XI

| Oil Blend | Almen Test, Weights Carried | S. A. E. Machine, Scale Load Reading |
|---|---|---|
| Base Oil | 2 | <20 |
| Base Oil+2% Additive Concentrate | 15 | <20 |
| Base Oil+5% Additive Concentrate | 15 | 82 |
| Base Oil+10% Additive Concentrate | 15 | 450–500 |

The lubricating oil base stocks of this invention may be straight mineral lubricating oils, or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloro ethyl ether, propane, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or voltolized products may be employed, either alone or in admixture with mineral oils.

For the best results the base stock chosen should normally be that oil which without the new additives present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed Diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of Diesel service, particularly with high speed Diesel engines, and in gasoline engine service, oils of higher viscosity index are often required, for example up to 75 or 100, or even higher, viscosity index.

In addition to the materials to be added according to the present invention, other agents may also be used such as dyes, pour depressors, heat thickened fatty oils, sulfurized fatty oils, organo metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds, and the like, may also be employed.

Assisting agents which are particularly desirable are the higher alcohols having eight or more carbon atoms and preferably 12 to 20 carbon atoms. The alcohols may be saturated straight and branched chain aliphatic alcohols such as octyl alcohol, $C_8H_{17}OH$, lauryl alcohol, $C_{12}H_{25}OH$, cetyl alcohol, $C_{16}H_{33}OH$, stearyl alcohol, sometimes referred to as octadecyl alcohol, $C_{18}H_{37}OH$, and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol or mixtures of these various alcohols, which may be pure or substantially pure synthetic alcohols. One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes, the wool fat, sperm oil or other natural products rich in alcohols may be used per se. Products prepared synthetically by chemical processes may also be used, such as alcohols prepared by the oxidation of petroleum hydrocarbons, e. g., paraffin wax, petrolatum, etc.

In addition to being employed in crankcase lubricants and in extreme pressure lubricants, the additives of the present invention may also be used in spindle oils, textile oils, metal cutting oils, engine flushing oils, turbine oils, insulating and transformer oils, steam cylinder oils, slushing compositions, and greases. Also their use in motor fuels, Diesel fuels and kerosene is contemplated. Since these additives exhibit antioxidant properties and are believed also to possess ability to modify surface activity, they may be employed in asphalts, road oils, waxes, fatty oils of animal or vegetable origin, soaps, and plastics. Similarly, they may be used in natural and synthetic rubber compounding both as vulcanization assistants and as antioxidants, and generally they may be used in any organic materials subject to deterioration by atmospheric oxygen.

The present invention is not to be considered as limited by any of the examples described herein, which are given by way of illustration only, but is to be limited solely by the terms of the appended claims.

We claim:

1. An organic composition consisting essentially of an oil containing from 0.02% to 15% of a product obtained by reacting from about 1 to about 3 molecular proportions of a compound selected from the group consisting of aliphatic and alicyclic compounds containing an unsaturated carbon-to-carbon linkage, at a temperature of about 20° to about 140° C., with 1 molecular proportion of a sulfur halide, and further reacting from about ½ to about 10 molecular proportions of the product thus formed with one molecular proportion of an aromatic compound at a temperature of about 40° to about 160° C.

2. A hydrocarbon product consisting essentially of a mineral oil and 0.02% to 15% of a product obtained by reacting from about 1 to about 3 molecular proportions of a compound selected from the group consisting of aliphatic and alicyclic compounds containing an unsaturated carbon-to-carbon linkage, at a temperature of about 20° to about 140° C., with 1 molecular proportion of a sulfur halide, and further reacting from about ½ to about 10 molecular proportions of the product thus formed with one molecular proportion of an aromatic compound at a temperature of about 40° to about 160° C.

3. A lubricant consisting essentially of a mineral lubricating oil base and 0.02% to 15% of a product obtained by reacting from about 1 to about 3 molecular proportions of a compound selected from the group consisting of aliphatic and alicyclic compounds containing an unsaturated carbon-to-carbon linkage, at a temperature of about 20° to about 140° C., with 1 molecular proportion of a sulfur halide, and further reacting from about ½ to about 10 molecular proportions of the product thus formed with one molecular proportion of an aromatic compound at a temperature of about 40° to about 160° C.

4. A lubricant consisting essentially of a mineral lubricating oil base and 0.02% to 15% of a product obtained by reacting from about 1 to about 3 molecular proportions of an olefin, at a temperature of about 20° to 140° C., with 1 molecular proportion of sulfur monochloride, and further reacting from about ½ to about 10 molecular proportions of the product thus formed with one molecular proportion of phenol, at a temperature of about 40° to about 160° C.

5. A lubricant according to claim 4 in which the final product in the preparation of the additive is purified by extracting the same with an aqueous caustic alkali solution.

6. A lubricant consisting essentially of a mineral lubricating oil base and 0.1% to 2.0% of a product obtained by reacting from about 1 to about 3 molecular proportions of a polymerized derivative of isobutylene, at a temperature of about 20° to about 50° C., with 1 molecular proportion of sulfur monochloride, and further reacting from about 3 to about 10 molecular proportions of the product thus formed with 1 molecular proportion of phenol at a temperature of about 80° to about 140° C.

7. A lubricating oil concentrate consisting essentially of a mineral lubricating oil base stock and about 25% to about 75% of a product obtained by reacting from about 1 to about 3 molecular proportions of an olefin, at a temperature of about 20° to 140° C., with 1 molecular proportion of sulfur monochloride, and further reacting from about ½ to about 10 molecular proportions of the product thus formed with one molecular proportion of phenol, at a temperature of about 40° to about 160° C.

8. An extreme pressure lubricant consisting essentially of a mineral lubricating oil base stock and about 2% to about 10% of a product obtained by reacting from about 1 to about 3 molecular proportions of an olefin, at a temperature of about 20° to 140° C., with 1 molecular proportion of sulfur monochloride, and further reacting from about ½ to about 10 molecular proportions of the product thus formed with one molecular proportion of phenol, at a temperature of about 40° to about 160° C.

9. An extreme pressure lubricant consisting essentially of a mineral lubricating oil base stock and about 2% to about 10% of a product obtained by reacting 1 to about 3 molecular proportions of a polymerized derivative of isobutylene, at a temperature of about 20° to about 140° C., with 1 molecular proportion of a sulfur chloride and further reacting from about ½ to about 10 molecular proportions of the product thus formed with 1 molecular proportion of a chlorphenol at a temperature of 40° to about 160° C.

10. A lubricant consisting essentially of a mineral lubricating oil base and from 0.02% to 15% of a product obtained by reacting from about 1 to about 3 molecular proportions of an olefin at a temperature of about 20° to about 140° C. with 1 molecular proportion of a sulfur halide, and further reacting from about ½ to about 10 molecular proportions of the product thus formed with 1 molecular proportion of an aryl amine at a temperature of 40° C. to 160° C.

11. A lubricant consisting essentially of a mineral lubricating oil base and from 0.02% to 15% of a product obtained by reacting from about 1 to about 3 molecular proportions of a compound selected from the group consisting of aliphatic and alicyclic compounds containing an olefinic linkage, at a temperature of about 20° to about 140° C. with 1 molecular proportion of a sulfur halide, and further reacting from about ½ to about 10 molecular proportions of the product thus formed with 1 molecular proportion of an aromatic sulfide at a temperature of about 40° to about 160° C.

12. A lubricant consisting essentially of a mineral lubricating oil base stotck and from about 0.02% to 15% of a product obtained by reacting from about 1 to about 3 molecular proportions of a polymerized derivative of isobutylene, at a temperature of about 20° to about 140° C., with 1 molecular proportion of a sulfur chloride, and further reacting from about ½ to about 10 molecular proportions of the product thus formed with 1 molecular proportion of a phenol sulfide at a temperature of about 40° to about 160° C.

13. A lubricant consisting essentially of a mineral lubricating oil base and from about 0.02% to 15% of a product obtained by reacting from about 1 to about 3 molecular proportions of a polymerized derivative of isobutylene, at a temperature of about 20 to about 140° C., with 1 molecular proportion of sulfur monochloride, heating the resulting product with about 10% to about 200% by weight of a phenol at a temperature of about 40° to about 160° C. and until substantial dehydrochlorination of the product has been accomplished, and removing the free hydrogen chloride formed in the foregoing steps.

14. A lubricant consisting essentially of a mineral lubricating oil base and from about 0.02% to 15% of a product obtained by reacting from about 1 to about 3 molecular proportions of a polymerized derivative of isobutylene with 1 molecular proportion of sulfur monochloride at a temperature of about 20° to about 50° C., heating the resulting product with about 10% to about 33⅓% by weight of phenol at a temperature of about 80° to about 140° C. and until substantial dehydrochlorination of the product has been accomplished, and removing the free hydrogen chloride formed in the foregoing steps by distillation.

15. A lubricant according to claim 14 in which the free hydrogen chloride formed in the preparation of the additive is removed from the product by distillation with steam.

CARL WINNING.
DILWORTH T. ROGERS.

REFERENCES CITED

The following references are of record in the file of this patent:

UNITED STATES PATENTS

| Number | Name | Date |
|---|---|---|
| 2,008,017 | Hester | July 16, 1935 |
| 2,218,447 | Badertcher | Oct. 15, 1940 |
| 2,244,886 | Lincoln | June 10, 1941 |
| 2,279,001 | Matheson | Apr. 7, 1942 |
| 2,322,376 | McCleary | June 22, 1943 |
| 2,361,352 | Otto | Oct. 24, 1944 |